(12) United States Patent
Slater et al.

(10) Patent No.: US 6,526,404 B1
(45) Date of Patent: Feb. 25, 2003

(54) INFORMATION SYSTEM USING HUMAN RESOURCE PROFILES

(75) Inventors: Falconer Alan Slater, Edinburgh (GB); John Calum Smeaton, Edinburgh (GB)

(73) Assignee: Sopheon Edinburgh Limited (GB)

( * ) Notice: Subject to any disclaimer, the term of this patent is extended or adjusted under 35 U.S.C. 154(b) by 0 days.

(21) Appl. No.: 09/403,366

(22) PCT Filed: Jan. 29, 1999

(86) PCT No.: PCT/GB99/00128
§ 371 (c)(1),
(2), (4) Date: Feb. 28, 2000

(87) PCT Pub. No.: WO99/39279
PCT Pub. Date: Aug. 5, 1999

(30) Foreign Application Priority Data

Jan. 30, 1998 (GB) .............................. 9801978

(51) Int. Cl.[7] .............................................. G06F 17/30
(52) U.S. Cl. .............................................. 707/5; 707/10
(58) Field of Search ..................... 707/1, 5, 10, 104.1, 707/501.1; 709/223, 224

(56) References Cited

U.S. PATENT DOCUMENTS 5,274,801 A * 12/1993 Gordon et al. ............... 706/45
5,862,223 A * 1/1999 Walker et al. ............... 705/1
5,995,105 A * 11/1999 Reber et al. ............... 345/336
6,208,984 B1 * 3/2001 Rosenthal ..................... 707/1
6,263,335 B1 * 7/2001 Paik et al. ..................... 707/5

FOREIGN PATENT DOCUMENTS

WO   WO98/02835   * 1/1998 ........... G06F/17/60

OTHER PUBLICATIONS

Ackerman et al, Answer Garden 2: Merging Organizational Memory with Collaborative Help, ACM, 1996, pp. 97–105.*
Kautz et al, Agent Amplified Communication, MIT Press, USA Aug. 1996, pp. 3–9 vol. 1.*

* cited by examiner

Primary Examiner—Jean R. Homere
Assistant Examiner—Debbie M. Le
(74) Attorney, Agent, or Firm—Foley Hoag LLP (57) ABSTRACT

A system is provided for use as a source of information and for providing to a user who makes a request for information, an answer to that request. The system includes an information library that includes at least a human resource profile source that typically includes details on a number of persons to whom the request can be selectively sent and from whom an answer is obtained. The system selects the recipients of the request on the basis of the human resource profiles and can also store answers and other information to which subsequent requests can be referred as well as other selected information sources. The system includes refinements such as the optional division of a human resource profile into aspects of interest and expertise; those aspects can be further divided into areas of specific subject matter.

17 Claims, 3 Drawing Sheets

INFORMATION SYSTEM USING HUMAN RESOURCE PROFILES

FIELD

The invention which is the subject of this application relates to a system of information storage, information appraisal and information retrieval and provision which is provided for users of the system, said users enabled to request, receive and, if selected, provide specific information.

The invention is provided in the form of a system which includes an information library comprising of a plurality of information sources which can be accessed via the Internet, Intranet or, within organisations, via interlinked or networked computer systems. Thus, for example, a relatively large organisation will have a centralised information library which can be accessed by its employees.

BACKGROUND SUMMARY

A common problem with all information libraries is the difficulties which users face in trying to correctly identify the information which is sought and, once identified, specifying and framing the request so that it can then be interpreted by the information retrieval system. Frequently, and unless the user is specifically skilled in the information request procedure, the request which is sent to the database from the user's terminal is incorrect and thus the information "hits" which the user receives from the system are largely irrelevant to the user. Thus the information library, while it may hold the required information is not used as the information is frequently not easily or conveniently retrievable.

At the present time two broad forms of information systems have been developed, Database systems and Information Retrieval systems. Database systems rely upon definitive information types and require specific requests to be made such, as for example, a database will hold a telephone number in a field which is known as "telephone number" and can therefore be definitively catalogued and stored for relatively easy retrieval.

Information retrieval systems relate to less clearly definable material such as for example, a series of numbers which could be a telephone number but could also be a number having another use or meaning, can be processed and retrieved from the information library by using less closely defined information requests.

Thus information retrieval systems allow the user of the information library to specify the object of interest rather than the specific interest. However a continuing problem is the need to ensure that the information which is returned to the user is relevant to their needs and to avoid the need for the user to look through a list of references, only a few of which may be relevant to their needs. At the present time there is a tendency for information received to be "all encompassing" and this does require the user to sort through the references given. This can be time consuming and irritating to the user to such an extent that the user may, in due course, be prejudiced against using the information library because the relevant information is so difficult to reach.

The aim of the present invention is to provide a system including an accessible information library comprising a number of information sources and a means for ordering the sources and accessing information from the same, which allows requests for information to be directed towards the most relevant information source in response to the information request thereby improving the relevance of the subsequent information provided to the user.

In a first aspect of the invention there is provided an electronic system for the provision of information to a user, comprising an information library having a plurality of information sources, at least one of said sources comprising stored information, a computer linked connection to said library by which a request for information can be made by a user by generating a request, a processor for processing the request, analysing the same to identify the request and address the request to the information source or sources in the library and identify the return information to the user; and wherein the information library includes at least one link to a human resource to which the request can be passed.

Typically the information returned to the user is any, or any combination of, information stored in the library memory and/or links to the sources to be contacted.

In a further aspect of the invention there is provided an information system, said system accessible by at least one user by inputting an information request; said system including at least one information source, comprising a database of human resource profiles, each of said profiles selectable with respect to an information request.

Typically the human resource profile or profiles is/are selected with respect to the relevance of the human resource expertise and/or interest to the subject matter of the request.

In one embodiment the information request is in the form of a series of key words, letters or phrases which are indicative of the subject matter of interest. In an alternative embodiment the reference code input is a series of characters which are recognised by the system. In a further alternative embodiment the information request is based on any of the information within the system.

Typically the human resource profiles are assessed as to whether they should be altered.

In one embodiment the human resource profiles are adaptive in response to requests for information and information supplied via the system.

In one feature of the invention the human resource profile is dynamically created by profiling various aspects of the human resource such as with reference to any, or any combination of, another human resource profile, multiple human resource profiles, other information library source or information sources external to the system in order to support them most effectively in their interactions with, and through, the system. Similarly, other information sources such as news-feeds, web sites, databases, email lists, previous dialogue and the like can all be included in the information library of the information system in addition to the human resource profiles. Typically the dialogue information source relates to previously submitted requests and answers and/or information.

It is a preferred feature of the system that profiles are updated on an ongoing basis based upon all available evidence. For example, reports/emails/memos written by a human resource, dialogues in which they participate, news and information feeds to which they subscribe, satisfaction with requests they have answered over a period of time, the success with which they have answered questions, the number of questions they have asked, are all possible factors. As new information becomes available it can be incorporated into the profile of the human resource so allowing the profile to track the changing nature of the human resource's expertise and interest, both of which are aspects which can be analysed and addressed with information requests.

Typically, each request is sent to a number of human resources, but prior to this it is typically the case that the other information sources in the library are first addressed to assess whether the answer information can be derived from there.

The reasons for sending the information request to a number of human resources can be that some human resources, despite their profiles indicating the contrary, will not actually be available to answer the request in the required time, the matching of the subject matter of the request to the profiles may not be perfect, and multiple human resource recipients means that the chances of at least one appropriate human resource receiving the question will be improved; and among the human resources appropriateness may vary. Preferably, all of the human resources will be aware of who else has received the question, and so have the opportunity to arrange amongst themselves who will actually answer the question to prevent duplication of work; some human resources may take an extended time to answer, and during the delay, another human resource may answer the request, so that the possible delay in an answer being generated is reduced. In some circumstances multiple human resources may decide to answer a request and so provide multiple perspectives on the same subject. Therefore, a multifaceted, more generic, and thus more useful response can be generated.

In one embodiment each human resource has a credit rating and each user can have a number of credits. If the user has sufficient credits to match the credit rating then a request can be forwarded to that human resource; if not, the request will not be transmitted to that human resource and only to those human resources with a credit rating which can be matched by the user. In a further embodiment the user can decide to select the credit rating range of human resources to whom he wishes the request to be sent.

The two primary subjective aspects of the profile when generating a profile for a human resource are Expertise and Interest; and these aspects are generated primarily from analysis of documents. For example, the contents of reports generated by a human resource are taken as indicative of their expertise, and the contents of Internet newsgroups to which a human resource subscribes is taken as indicative of their interest.

It is recognised that both Interest and Expertise can be made up of multiple, possibly overlapping areas. The actual content and breakdown of these individual areas are recognised as being subjective, and personal. Therefore, the system allows a human resource to group the documents used for profiling into areas in an arbitrary manner. This provides a mechanism whereby the relative numbers of documents available in each of the areas can be normalised. That is, although a human resource may be able to make available ten times as many documents in one area than another, it does not necessarily follow that the human resource is ten times as interested/expert in that area, as a weighting is attached to each so that a human resource can input and identify their relative interest/expertise in them. Furthermore, the human resource can differentially weight individual documents and groups of documents within an area to reflect their confidence in the appropriateness of them being indicative of their expertise/interest.

As an ongoing development of a human resource profile the system can automatically assign documents and responses to a human resources subjective profile and assign values to the objective aspects of "group profiles" i.e. groups of which the human resource is a member. The human resource can, if desired, manually assign additional documents from within, or external to, the system as they see fit, at any time.

Typically, the manual addition of documents is done with the system automatically arranging documents in a subjective profile aspect for each human resource. Further, the process is not restricted to simple additions of documents, as full dynamic manual and automatic editing can be performed.

Dynamic profiling of a human resource can be undertaken by the system in response to use of the system and use by the user of the system. The dialogue entered into by the human resource, developed texts, their workload, work rate and level of performance can also be taken into account.

One important source of dynamic profiling information is the question and answer dialogue entered into by the human resource. The system can use the contents of dialogues as evidence of expertise for those human resources actively answering questions, and use them as evidence of interest for those users asking questions, or for any other users registered as interested in the progress/outcome of the dialogue. These documents can be selectively incorporated into the subjective profile of human resources immediately and on an ongoing basis.

The workload or work rate analysis typically takes into account, for example, the number of questions that a human resource has answered recently, or has been involved in answering over various periods of time. It will indicate how "busy" a human resource is currently, or has been at any arbitrary point in the past. Thus the profile analysis can contain the current number of questions provided by a human resource that have been deemed as useful appropriate by the user asking the question. It will provide a similar metric to that of workload over similar periods and at similar points in time.

In use therefore when a query is raised on the system according to the invention, the processor of the system analyses the query and addresses the information sources held in the information library, typically accessing the sources in a sequence which may, for example, start with the system database in which will be held replies to previously answered questions, then, if not successful, interment news groups and then, if not successful, the information source in which the human resource profiles are held and identify the most relevant expert human resource or resources by reference to the human resource profiles. The query is then addressed to the expert human resource or resources e.g. by e-mail or other method. The expert human resource or resources can then consider the query and answer the same and return the answer to the system for storage and transfer to the user who raised the query. In a preferred embodiment the answer provided is stored in the system database such that if the same or similar query is raised at a later date by a user of the system, the stored answer will be returned to the user and there will be no need for the request to be passed to a human resource or resources to be contacted directly, unless for example, having received the answer, the user raises a further, more detailed, query.

Typically, a human resource can be any person who is contactable via the system and a system user can be an administrator, a user with a human resource profile or a guest with no or zero human resource profiles.

In a further feature of the invention a user of the system can also be given a human resource profile at the time of first use which is representative of the request raised. Thus, if that user continues to raise requests in relation to a particular field and receive answers, then that human resource's profile will develop to indicate the increasing expertise which they are developing in the particular field. Thus, it is important to note that although the information library can include human resource profiles when initiated, once the system is in use, all users of the system become potential experts whose details and profiles can be held in the information library and can be accessed when queries are raised. In practice, many of these "experts" will not receive a question as their profile will indicate a low level of expertise in any particular field.

In a yet further feature of the invention and in particular where the system is in use in an organisation and the users are all drawn from within the organisation, the profiles for experts can also include an indication of that persons position within the hierarchy of the organisation and/or level of workload. Thus if a particular expert is indicated as having particularly strong expertise in a particular field but also as being the Managing Director or having a particularly busy workload at that time, a question which would normally be sent to them can instead be relayed to a human resource with a lesser level of expertise but with more time available to answer the question.

It will be appreciated that for the system to operate successfully, answers must be provided in a timely fashion. To this end response times can be recorded and, if found to be slow, reminders can be sent and/or other pressures brought to bear such as for example, threat of suspension from use of the system.

In addition to receiving a question and in the process of answering the same, an expert human resource may simultaneously become a user insomuch that they may also raise requests in their answer, with said queries analysed by the processor of the same and transmitted to the appropriate human resource or human resources.

In use the profiles and information library and search processing are based on the use of conventional information retrieval probability techniques utilising algorithms and representative means to allow the queries, information and answers to represented in a manner which can be addressed and interpreted by the processor of the system. Thus while the technology to drive the system may be known, the application of the technology in a manner as so described which makes the system of the current invention distinctive and adaptive and therefore a significantly more attractive information tool for users.

It is envisaged that in a preferred embodiment a human resource can, at any time, view the contents of their profile. Where appropriate, the human resource can also edit them, in certain situations. For example, a "general availability" aspect can be changed to zero when a human resource feels they are too busy to answer questions or to be involved in discussions, or alternatively a "security level" aspect can be viewed but not changed by a normal human resource. If a human resource feels a non-editable aspect (such as security, performance, cost) has an inappropriate value, then they can appeal to a system administrator to have the value changed or have the process of automatic updating modified for their profile.

The subjective aspects (e.g. Interest and Expertise) can be made up of a number of weighted areas. The number of areas, and the weights associated with them are visible and editable at any time. A human resource can view, appraise and modify them. For example, by deleting an existing area; adding a new area; changing an area's weight. The areas are made up of documents, each individually weighted. A human resource can add and delete documents into/from an area, and can change the individual weights of the documents.

In addition to the expert's information source, the other information sources can also be given profiles which will contain many, but not necessarily all, of the same aspects. For example, a ticker-tape style newsfeed may not contain an interest aspect but can contain an expertise aspect made up of a weighted arrangement of the documents within it and will be updated dynamically to represent the current contents of the resource.

A further feature of the profile generated for each human resource is that when a human resource is made a member of a group (e.g. when a new human resource profile is created, or a human resource changes job description) that human resource's profile inherits the subjective profile information from the group being joined. Whenever the group profile is modified, then the inherited information is modified immediately. In this way a human resource profile continually and dynamically inherits profile information from all groups of which they are a member. The inverse process occurs when a human resource is removed from a group.

A group profile can be updated continually to reflect the current profile information of all its members. The profiles of all the human resources, and the existing group profile can be combined to form a new profile for the group. In this way, a human resource joining a group can inherit the most up-to-date representation of the group interest and expertise.

With the initial profiles created, the profiles are used and referred to by the system to allow efficient and effective directing of information requests, if that information source is accessed.

For example, for an information request the subjective human resource profile aspects are referred to so that the expertise aspect of the profile of any resource is used primarily to attract requests to the most relevant human resource to answer same.

Alternately, or in addition, for an information request the subjective profile aspects are referred to in that the interest indicator in the profile is used to attract requests to the most relevant human resource to answer same.

The subjective profile aspects are used to influence and supplement the basis profiles. For example a profile may include wealth and costs aspects such that the wealth of a human resource is used in conjunction with the cost of an expert or other resource to balance the amount of cost a human resource is willing to incur in having a request answered. Group Membership can be used to preferentially route a question from a specific human resource (based upon the human resource's memberships) to a specific group of human resources. In another example, it is used to determine those human resources who should preferentially receive, for example, an incoming news-feed article. Security can be used to determine whether a human resource can obtain answers from certain databases.

The system therefore performs a weighted combination of the degrees of match between the source and the potential destinations of a message based upon each aspect of the profiles involved. It is the combination that generates a final degree of routing match. That match is then used to send the message to the most appropriate destination or destinations.

The system can integrate "hard" and "soft" rules, when combining the various profiles for routing. This allows one aspect to selectively override another. For example, even if a human resource has the higher level of Interest match to an object, the overall routing match will be zero if the Security aspect of the human resource's profile is not sufficient for him to be allowed access to the resource.

A further combination of soft and hard rules might temporarily disable the effect of Security for routing if the degree of expertise/interest match is high enough. Under this scenario, the human resource would be told that a certain resource is ideally matched to their question, but the basic security mechanisms of the system would prevent access to the resource. The human resource would then be in a position of knowing that a potential answer exists and of being able to seek an explicit security clearance for the document in question.

The system can be set to balance, so far as possible, the workload across a group of human resources. The current workload of a potential expert human resource is incorporated into the routing match such that the higher the workload, the lower any routing match will be. This means that even though an expert human resource achieves a high expertise match, if his workload is significantly higher than that of another expert human resource whose expertise match is lower, then the question will be sent to the less "overworked" expert. This decision is made in a manner that attempts to minimise (or keep to an acceptable minimum) the disparity of workloads across a group of human resources. In this way, the system can balance the workloads of a group or multiple groups of experts.

The use of "soft and hard" rules means that the profile system can be adaptive such that, for example, a soft rule such as work load balancing can be over-ridden by another soft rule such as a particularly high expertise/interest match.

The system can indicate to a human resource those documents, areas, or aspects of a profile that most contributed to a particular routing decision. In this way a human resource is supported in editing a profile when they believe that the system is making inappropriate decisions.

BRIEF DESCRIPTION OF THE DRAWINGS

Specific embodiment of the invention will now be described with reference to the accompanying Figures wherein.

DETAILED DESCRIPTION OF CERTAIN ILLUSTRATED EMBODIMENTS

Figure 1:
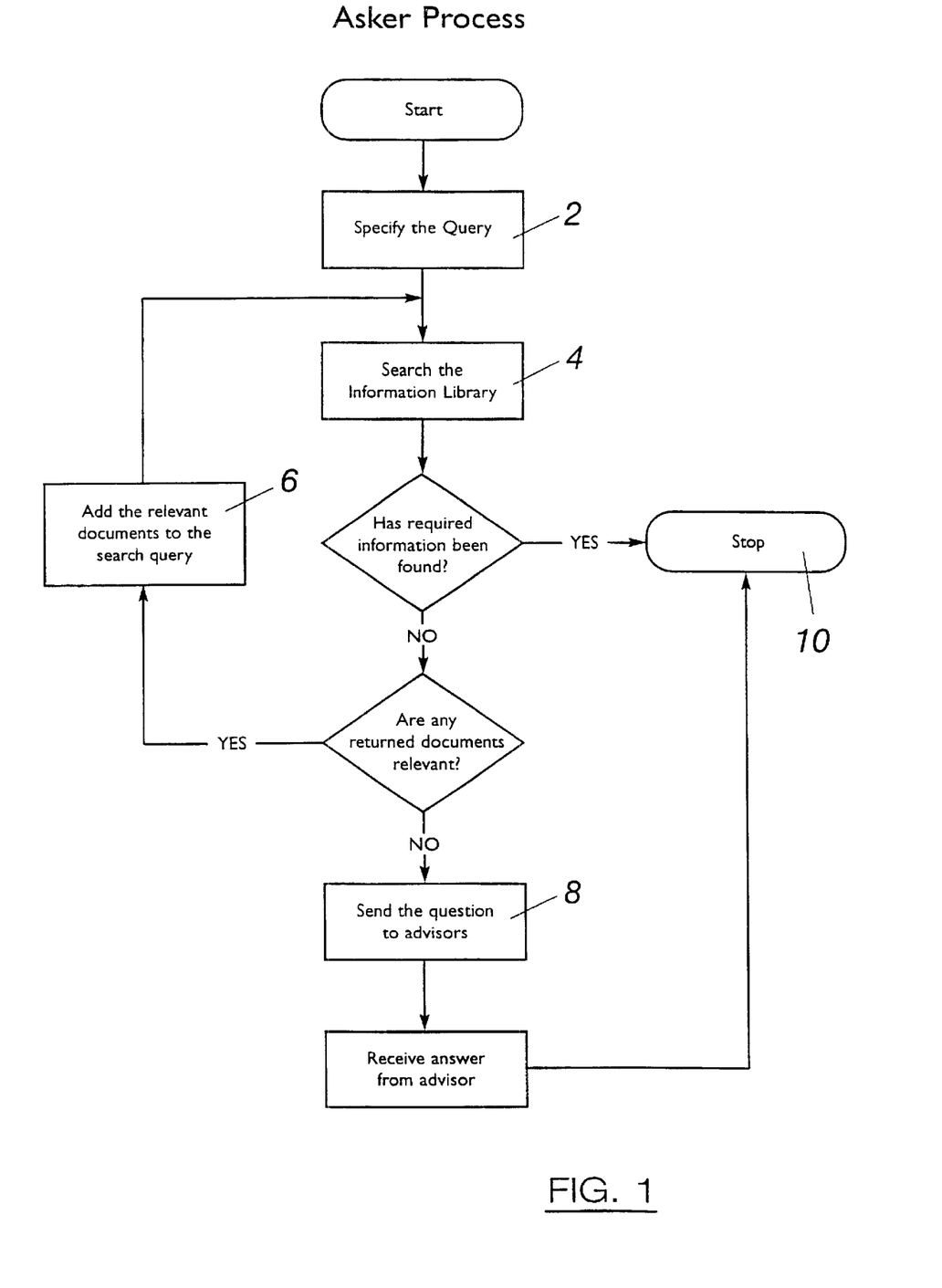
FIG. 1 relates to one embodiment the process followed when a request is made of the system of the invention.

Referring to FIG. 1 it is shown how the request is specified by the user at 2 and the information library 4 which typically comprises a number of information sources is searched. If the requested information is found then the asker or request process stops. If no information is found but some of the documents returned are of relevance, the documents are added 6 as a refinement to the search request 2 and the search of the information library 6 repeated. If however none of the documents are of relevance the first time or the repeated search is not successful, the request is sent to one or a number of human resources or advisors 8 and an answer is received at which stage the asker or request process stops 10.

Figure 2:
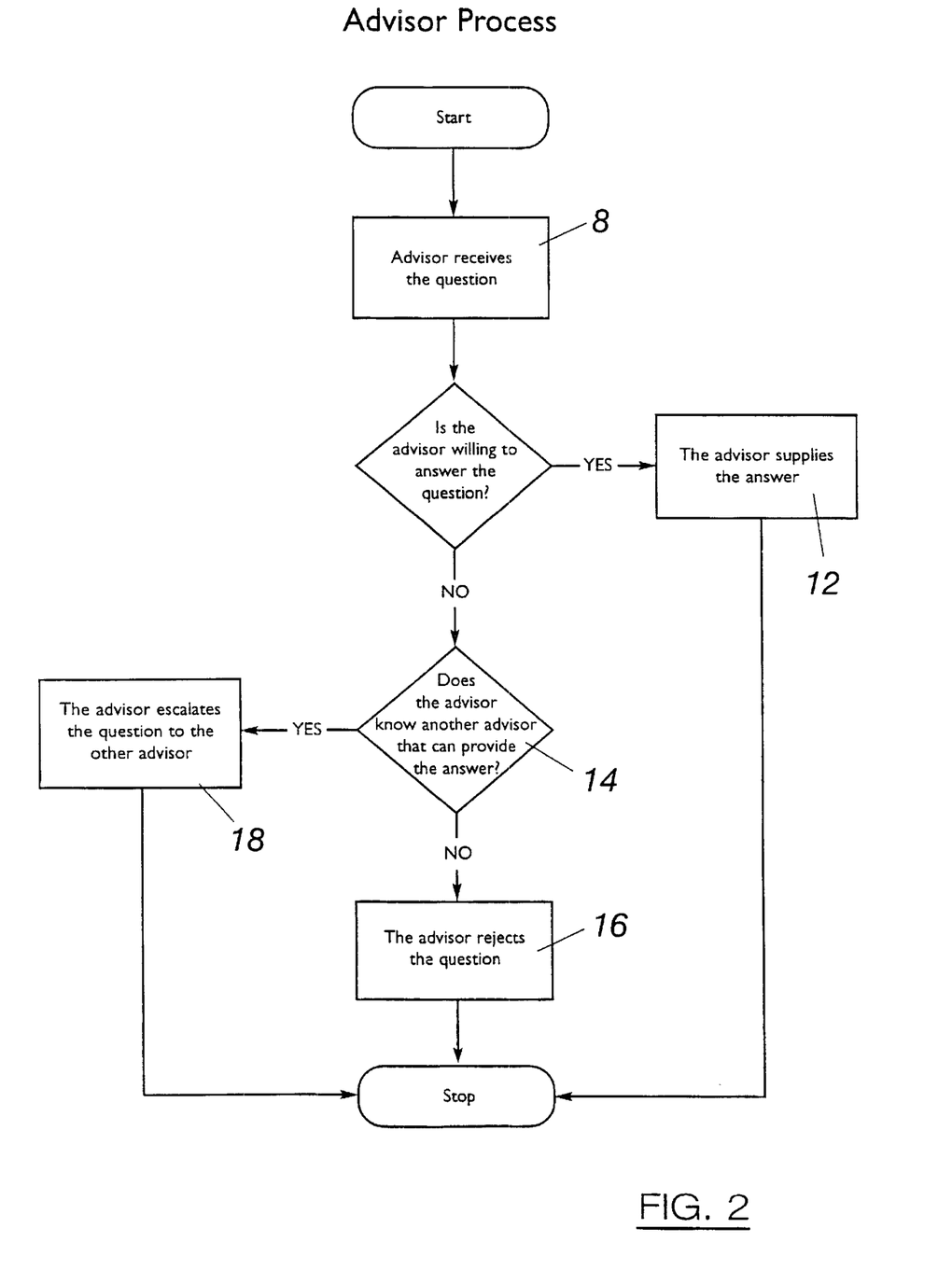
FIG. 2 relates to one embodiment of the process followed by the Advisor or Human resource or resources when the request for information is received.

FIG. 2 illustrates in greater detail the process followed by the human resource when they have received a request for information. Bearing in mind that the advisor has been sent the request on the basis of an analysis of their human resource profile indicating that the request is of relevance to them, the first question is whether the advisor is willing to answer, if the answer is yes then answer is supplied 12, but, if not, the advisor is asked 14 whether they can refer the question to another advisor who is able to answer the question. If the answer is no then that advisor is entered as having rejected the question 16. If the answer is yes then the request is addressed to the further advisor 18.

Figure 3:
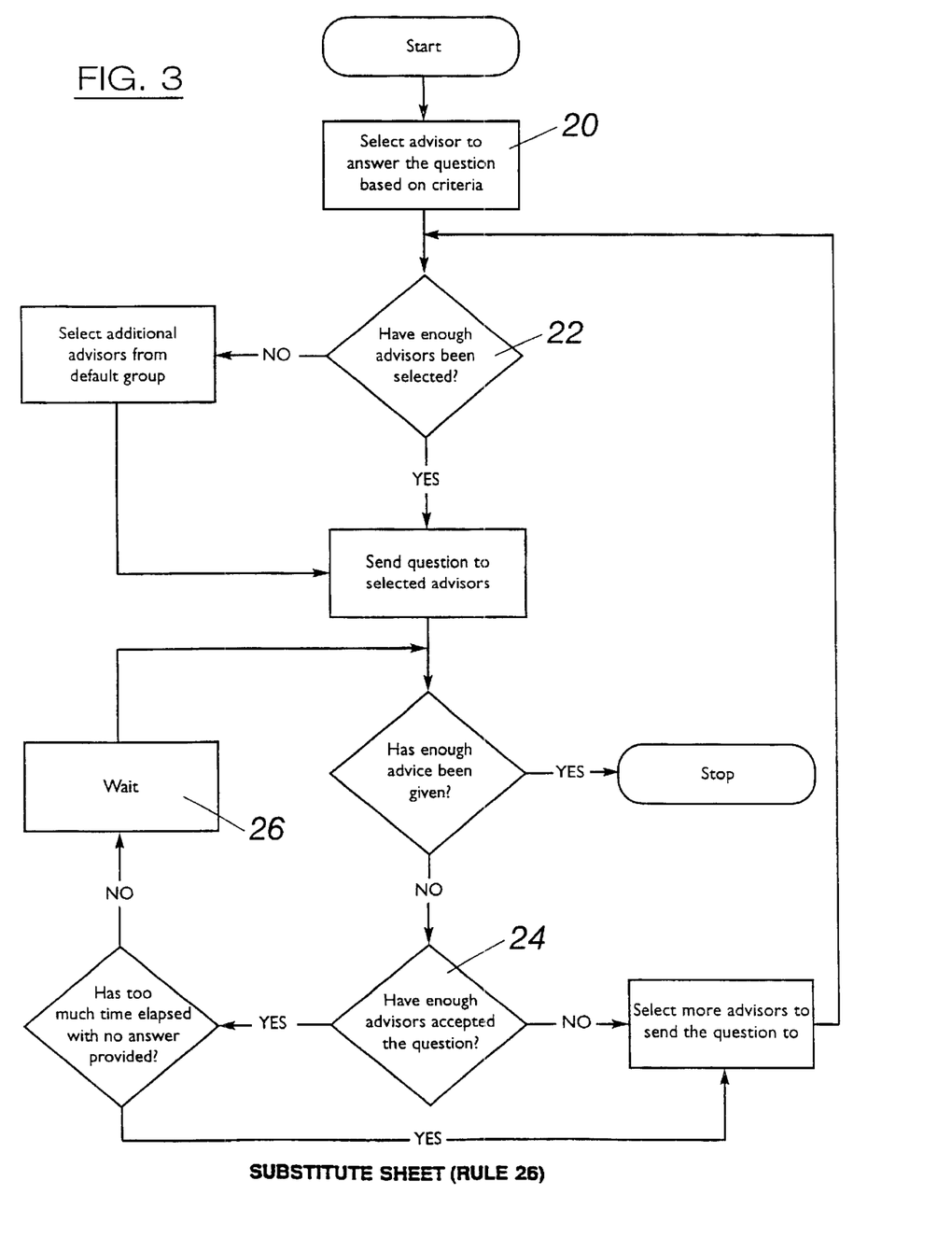
FIG. 3 illustrates the router process in one embodiment of the invention which is followed to deal with the request and response provided.

FIG. 3 illustrates the process followed intermediate the user making the request and the human resource advisor who is answering. When a request is made, and the information to answer the same is not directly available from the information library, the first stage of the process is to identify, with reference to the human resource profiles, the human resource or resources to whom the request should be sent 20. If it is determined that enough resource advisors have been selected 22 then the request is sent to each selected advisor. If the answer is no, additional advisors can be selected before the question is sent. If the advice received is sufficient for the request then the process stops and the advice is forwarded to the user. If insufficient advice is provided then the number of human resource advisors who have accepted the request is analysed 24. If a sufficient number have accepted the question then the question of whether enough time has been allowed for the response is raised. If insufficient time has been allowed the process can wait 26 for a further time before readdressing whether sufficient advice has been received. If sufficient time has been allowed for a response and/or not enough advisors accepted the question at stage 24, the process returns the request to step 22 in the process to allow the request to be reprocessed.

There now follows an example of the development and use of an extremely simplified system broadly in line with the processes of FIGS. 1–3 in practice.

A system according to the invention is to be developed in a small company specialising in electronic hardware comprising a managing director, a financial director and a technical director and two support staff A and B. The managing director is acknowledged as starting the company and originally had an idea for a product on the basis of which the company was started. That product demand has now declined and the company is developing new products which the Managing Director understands and spends time marketing to potential customers, but is not involved in the actual development.

The financial director is not technically minded but does keep tight control on expenditure, debtors and the like and also controls the purchasing of all incoming goods.

The technical director is relatively new to the company and has been brought in to help develop the new products and works with the support staff to do so and arranges for the external manufacture of components for the products. The Technical Director is particularly busy during the development stage.

The support staff A and B are experts in electronics and mechanical engineering respectively.

Thus to create a system in this company, all of the members are users and treated as human resources and each are provided with a profile. An information library is created and includes a number of information sources, one of which is an electronic database which is accessible via the networked computer terminals of each member of staff and which includes the human resource profiles. The information library can be represented to be readable by a processor which processes the queries input by the users via their computer terminals and then address the information library.

If, for example, we take support staff A who is skilled in electronics but wants to know details of a particular electronic component which is manufactured for them, he would input the appropriate query using key words on his computer terminal. The processor reads the query and addresses the information library. As the answer is not already stored it addresses the human resource profiles and identifies that the Technical Director who deals with the component manufacturers is the best suited expert. He is then sent the question at his e-mail address and instructed to answer. With the answer provided, it is sent to Support staff A. However support staff A has a further query relating to this and raises a further query. This further query is again processed and sent to the same expert who can then provide the further information. At this stage Support staff B has been told that this same component has to be incorporated into a casing and wants to know if there are any special requirements for the same. He raises the question via his terminal and the request is processed with reference to the information library. In the first instance the system will retrieve the two answers previously given to Support Staff A and send these to him so that no expert is directly contacted. He then has a further query with regard to the size of the component which has not been answered and he enters this into the system and as it is not on record, the human resource profiles are analysed. However in this case rather than the Technical Director alone being contacted, Support staff A may also be contacted for an answer as the dynamic nature of the system has ensured that, by raising the earlier queries and receiving answers, the profile of Support Staff A has been updated and he is now deemed to be an appropriate person to contact especially as the Technical Director is indicated as being particularly busy and may therefore have a longer response time at that instant.

Thus this example illustrates the manner in which the system operates and it will be easily appreciated how particular questions are directed to a particular expert or experts with regard to their profile. The system is utilised using computer hardware and software which allows the probability analysis of information and it is the dynamism and continued adaptation of the system through use of the same which provides the advantages as set out.

The information sources which can be accessed will typically be in order, a system database which includes details of answers and dialogue which has previously accrued, and which is analysed to ascertain whether it can be reused, internet and internet newsgroups to ascertain whether the information can be obtained for these and, if not, the information system human resource profile source which will allow the most appropriate human resource experts in the field to which the question relates to be identified and the question directed to them, if available, for their personal response.

There is therefore provided a system which is adaptive and allows, relevance feedback during searching; automatic adaptation of scheduled searching and news-feed filtering based upon implicit and explicit user satisfaction; automatic adaptation of all aspects of human resources' profiles based upon behaviour; expert performance ratings based upon questioner satisfaction; routing of questions influenced by automatically and manually set profile aspects such as quality of experts/resources used and the costs involved; escalation routing based upon predefined structures/groups/seniority and recent success.

What is claimed is:

1. An electronic system for the provision of information to a user, comprising;
    an information library having a plurality of information sources, at least one of said sources comprising stored information;
    a computer linked connection to said library by which a request for information can be made by a user by generating a request;
    a processor for processing the request, analysing the same to identify the request and address the request to the information source or sources in the library and identify and return information to the user;
    and wherein the information returned to the user is any, or any combination, of information stored in and automatically retrieved from the library memory and/or links to at least one information source to be automatically contacted if a part or all of said information requested is not stored in said library memory, said sources including a database of human resource profiles to which the request can be passed, the human resource profiles including expertise and/or interest aspects;
    and wherein the human resource profiles are selected with respect to the relevance of the expertise and/or interest of the profile to the subject matter of the request.

2. An information system according to claim 1 wherein the information system includes an information source comprising dialogues resulting from previously submitted information requests and/or information independently entered.

3. An information system according to claim 2, or wherein the information request comprises any of the information system contents.

4. An information system according to claim 1 or 2, wherein, in use of the system human resource profiles are adaptive in response to one, or any combination, of: requests for information, information supplied via the system and dialogues resulting from information requests.

5. An information system according to claim 1 or 2, wherein a human resource profile can be created from any, or any combination, of: another human resource profile; multiple human resource profiles; and/or other information library sources or information sources external to the system.

6. An information system according to claim 1 or 2, wherein, prior to an information request being transmitted to another human resource of the system for their attention, the information sources known to the system are accessed to assess whether the answer to the request can be derived from the same without the need to make a specific request to another human resource.

7. An information system according to claim 1 or 2, wherein if an information request cannot be answered with reference to known information sources, the request is transmitted to at least one human resource of the system for their responses.

8. An information system according to claim 1 or 2, wherein when an information request is raised, the processor of the system analyses the information request, analyses the information source of human resource profiles to weight the same with respect to the relevance of the expertise and/or interest of the profile to the subject matter of the information request.

9. An information system according to claim 1 or 2, wherein the human resource profile includes scalar value components.

10. An information system according to claim 9, wherein the scalar value components can include any, or any combination of: availability of the resource; cost of the resource; workload of the resource; seniority of the resource; security level of the resource; and/or performance of the resource in answering requests.

11. An information system according to claim 10, wherein the satisfaction level of the performance of the human resource or resources in answering previous requests is a factor of the profile for the human resource or resources.

12. An information system according to claim 1 or 2, wherein the users of the system can be on the basis of a system administrator, a human resource with a profile and/or a guest with no or a zero profile.

13. An information system according to claim 1 or 2, wherein each of the human resource profiles is allocated with a credit value and in order for an information request to be directed to and answered by a particular human resource profile the user must have sufficient credits to match the value of that human resource profile.

14. An information system according to claim 13, wherein the user may set a credit value limit to an information request to prevent the request being sent to human resource profiles that have credit ratings that fall outwith the limit set.

15. An information system according to claim 1 or 2, wherein the human resource profile includes aspects relating to the resource's expertise and/or interest.

16. An information system according to claim 15, wherein the human resource profile aspects include one or more areas, each area relating to specific subject matter.

17. An information system according to claim 2, wherein the dialogues represent expertise for human resources answering requests and interest for human resources submitting requests.

* * * * *

UNITED STATES PATENT AND TRADEMARK OFFICE
CERTIFICATE OF CORRECTION

PATENT NO. : 6,526,404 B1
DATED : February 25, 2003
INVENTOR(S) : Slater et al.

It is certified that error appears in the above-identified patent and that said Letters Patent is hereby corrected as shown below:

<u>Title page,</u>
Item [75], should read:
-- [75] Inventors: Alan Falconer Slater, Edinburgh (GB);
Calum John Smeaton, Edinburgh (GB) --

Signed and Sealed this

Twenty-second Day of July, 2003

JAMES E. ROGAN
*Director of the United States Patent and Trademark Office*